Dec. 15, 1936.                  C. B. GRAY                    2,064,796
                       TOOL FOR METAL CUTTING MACHINES
                              Filed April 24, 1936
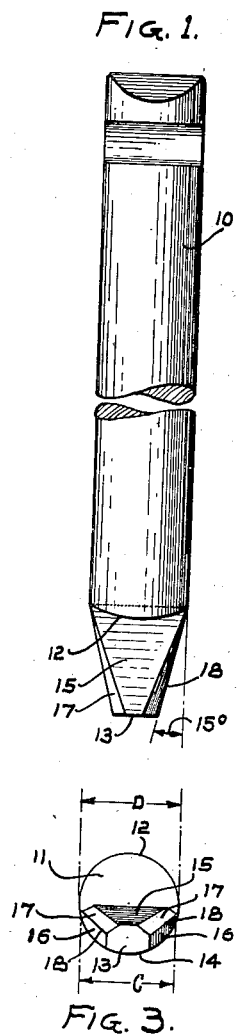
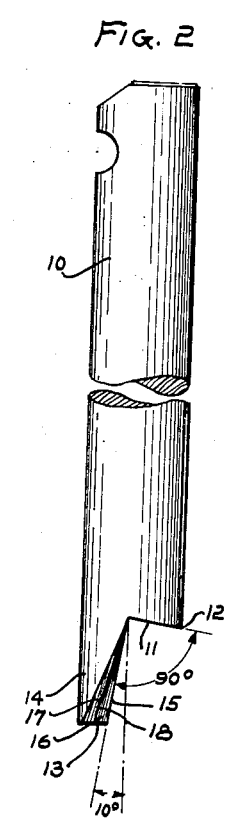
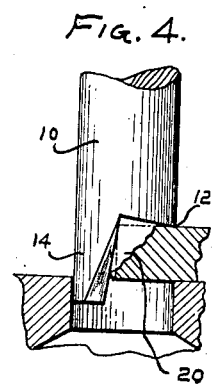
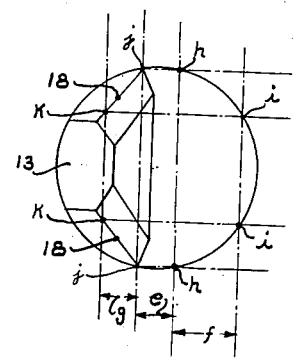
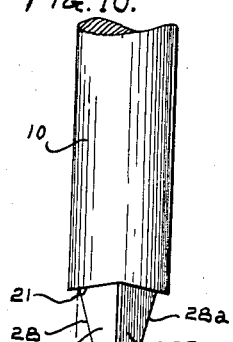
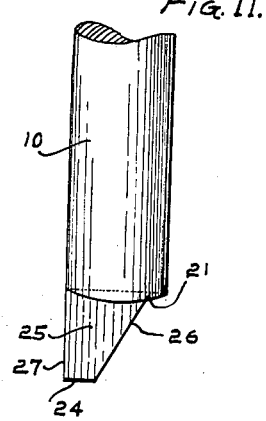
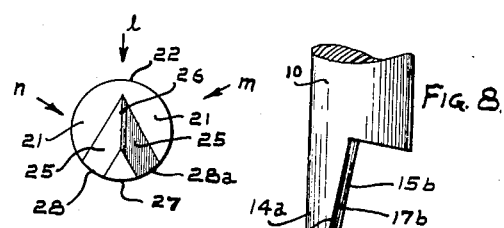
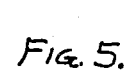
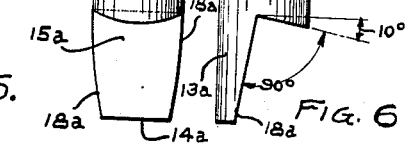
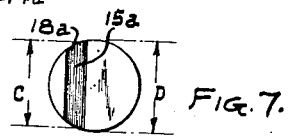
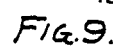
INVENTOR
CHARLES B. GRAY.
BY
    a. B. Ravis
    ATTORNEY Patented Dec. 15, 1936

2,064,796

UNITED STATES PATENT OFFICE 2,064,796

TOOL FOR METAL CUTTING MACHINES

Charles B. Gray, Milbourne, Pa.

Application April 24, 1936, Serial No. 76,245

12 Claims. (Cl. 164—124)

My invention relates to tools of the reciprocating punch type for machines for cutting sheet form material and it has for an object to provide a tool of this character having a pilot for limiting the increment of feed and which is constructed and arranged to accommodate slug spreading and which will assure overlap of the cutting face with respect to stock even though there may be considerable slug spreading or if thick material is being cut.

Machines of the nibbling or reciprocatory punch type for cutting sheet form material are well known. With these machines, some means must be employed to limit the increment of feed, as cutting or slitting is secured by a succession of overlapping cuts by the tool with respect to stock, and the tool may have the pilot or feed-limiting element formed integrally therewith. Not only must the feed be limited, but the stock must be guided in order that a line may be followed. The integral pilot may be of a type necessitating a templet for following a line or the pilot may be of such construction that it keeps the work centered so that the operator is able to follow a line by properly feeding the work. The present invention is applicable to a pilot of either type and comprises features providing for tapering of the pilot both in the normal direction of feed as well as transversely thereto to provide room for slug spreading and to assure overlap if there is considerable slant to the cut induced by slug spreading. Accordingly, a further object of my invention is to provide a tool having a pilot of this character.

With a tool having an integral pilot, slanted cuts are difficult to avoid and slanting may become so great as to interfere with cutting. In starting a cut from an edge of a sheet, depending upon the extent of slug spreading, there may be more or less slanting before normal cooperation of the slot end and pilot are established. Then again, if the operator should fail to keep the work pressed against or fed to the pilot, objectionable slanting may occur. The slanting difficulty, for either of these causes, is increased with thicker and tougher materials. If the slant becomes too great, for the cutting face overlap, cutting is interrupted. The reason for slanting is on account of a spreading slug pressing against the front of the pilot. If the pilot has an upright front face, obviously the spacing of lines including the guide edges from the line passing through the center of the cutting edge, is uniform for the length of the pilot with the result that the overlap is constant irrespective of where along the pilot the material is engaged, and spreading may produce such slanting, with feed of material limited by the pilot, that the cutting face will overlap only a slanted previous cut, in which event the cutting effort will push the work back. This difficulty is particularly pronounced in starting a cut from one edge of material because then the edge of the material will be bearing flush against the pilot face. In accordance with the present invention, the pilot is so formed that the overlap is increased as the material engages lower and lower along the pilot, with the result that one may easily come out of a slanted condition when starting from an edge or if the material should be carelessly handled while cutting. Accordingly, a further object of my invention is to provide a tool having these advantageous features of construction and of operation.

A further object of my invention is to provide a tool having a pilot whose front face is inclined rearwardly and downwardly in order that the feed-limiting lines of the side guide edges may be spaced progressively greater distances downwardly from the center line of the cutting face.

A further object of my invention is to provide a pilot whose guide edges converge downwardly and recede backwardly from the center line of the cutting edge.

A further object of my invention is to provide a tool having a pilot with a backwardly-slanting front face and having a cutting face provided with rake.

A further object of my invention is to provide a cylindrical tool having a cutting face and a back pilot, the cutting face intersecting the cylindrical surface to provide an arcuate cutting edge whose ends are separated by the pilot and the pilot being bounded by the cylindrical surface and by surfaces which converge in a downward direction with respect thereto to provide taper both in the axial plane bisecting the arcuate cutting edge and in the axial plane normal to the bisecting plane.

These and other objects are effected by my invention, as will be apparent from the following description and claims taken in connection with the accompanying drawing, forming a part of this application, in which:

Fig. 1 is a front elevation of a tool having my improved guiding pilot;

Fig. 2 is a side elevation of the tool shown in Fig. 1;

Fig. 3 is a plan view of the tool shown in Fig. 1 and looking up;

Fig. 4 is a sectional view showing the improved pilot in relation to work;

Fig. 4a is a diagram;

Figs. 5, 6, and 7 are plan or elevational views of a further modified form of tool;

Figs. 8 and 9 are similar to Figs. 5 and 6 with side relief or bevels added; and Figs. 10, 11, and 12 are views similar to Figs. 1, 2, and 3 but showing a modified form of pilot.

Referring now to the drawing more in detail, in Figs. 1, 2, and 3 the cylindrical tool body 10 has a cutting face 11 intersecting the cylindrical surface of the body to provide the arcuate cutting edge 12 whose ends are separated by the pilot 13 integral with the body.

The pilot 13 is bounded by the back surface 14, which is a part of the body cylindrical surface, by the front surface 15, by side surfaces 16, and by bevel surfaces 17, the corners 18 formed by the surfaces 16 and 17 forming guiding and feed limiting edges.

Referring to Figs. 2 and 3, it will be seen that the upper end of the front surface 16 coincides with or is approximately coincident with the body diameter. Since feed is limited by the pilot contacting with the previous concave cut, if there is to be any feed increment, the guide edges must be spaced apart less than a diameter. Accordingly, the bevel surfaces 17 provide guide edges 18, which, adjacent to the cutting face 12, are spaced apart a chordal distance $c$ less than the diameter $d$, the increment of feed depending upon the difference of these dimensions.

Downward taper of the pilot transversely is secured by convergence of the sides 16; and, in the normal direction of feed, by convergence of the front face 15 with respect to the back face 14. More particularly, the side faces 16 are inclined at approximately 15° with respect to planes tangent to the body surface, or the angle included between such side surfaces is of the order of 30°. The front face 15 is inclined downwardly and rearwardly at an angle of the order of 10° with respect to the axial plane normal to the axial plane bisecting the cutting edge. Thus, by convergence of the side faces 16 transverse taper is provided, and, by convergence of the front face 15 with respect to the back face 14, taper in the direction of feed is secured.

Downward tapering not only provides room for slug spreading but assures overlap of stock by the cutting edge. For example, in Fig. 4, should the slot end 20 of the work tend to slant because of the effect of slug spreading, then, if the pilot were not tapered, obviously the bottom edge of the concave slant cut would contact with the pilot guide edges and there would be no overlap; however, due to the combined taper, this interference is avoided and the work may be fed further back with the result that overlap is assured.

Preferably, the cutting face 11 includes an angle of approximately 90° with respect to the pilot front face 15, thereby giving a certain amount of bite or rake to the cutting edge to improve the cutting action.

The effect of rearward slant of the pilot front face and convergence of the guide edges will be apparent from Fig. 4a. If the guide edges were in a plane parallel to the tool axis, then, at the cutting face, assuming a straight cut, such edges would engage the concave slot end as indicated at $h, h$, and, if the slot end is slanted, as shown in Fig. 4, the work would engage lower down along the guide edges as indicated at points $k, k$, which, because of being spaced apart less than the points $j, j$ increase the overlap $e$ by the amount $f$, and because of being spaced back of the points $j, j$ further increase the overlap by an amount $g$. In other words, if the overlap is $e$ with the points $j, j$ engaging the slot end, the overall overlap would be increased to $e-f-g$ with the points $k, k$ engaging the slanted slot end at $i, i$. These additional overlaps, which vary dependent upon the slant of the slot end, always permit of sufficient effective overlap or bite for continuous cutting, it being understood that the term "overlap", as used herein, includes the entire distance from the engaged pilot points to and including the effective overlap or bite, and, by "bite", is meant the effective cutting overlap of the work by the cutting edge.

In Figs. 5 and 6, there is shown a construction wherein the pilot 13a is defined entirely by the front face 15a and the back face 14a, the front face 15a intersecting the body cylindrical surface to provide lateral feed limiting and centering edges 18a. This manner of providing the latter edges necessitates that the upper edge of the front face 15a shall be spaced back from the diameter to give a chordal distance between the edges 18a at the cutting face somewhat less than a diameter.

Figs. 8 and 9 show a construction similar to Figs. 5 and 6, the only difference being that the front face 15b has its upper end coincident or extending forwardly of the diameter, side relief or bevels being provided at 17b to give the necessary spacing between guide edges 18b at the cutting face less than the diameter.

The advantage of side bevelling, as shown at 17 in Figs. 1, 2, 3, and 4, and at 17b in Figs. 8 and 9 is that a pilot of greater cross-section at the cutting face, and, therefore, stronger may be provided, the necessity of having the chordal distance between guide edges less than a diameter being provided for by side bevels. As, by the use of the side bevels, the pilot front face is not restricted by the desired spacing of the guide edges, such front face may extend to the diameter or forwardly thereof so long as it does not extend so far forward as to interfere with the intended tool action.

In Figs. 10, 11, and 12, features of the invention are shown applied to a tool intended to be used with a templet. In these views, the cutting face 21 intersects the body cylindrical surface to provide the arcuate cutting edge 22, whose ends are separated by the tapered pilot 24.

The pilot 24 is bounded by front faces 25 and the back face 27 formed by the body cylindrical surface, the front faces or surfaces intersecting each other to provide the pilot front edge 26 and with the cylindrical back surface to provide the side edges 28, 28a. The tool should be ground to position the faces in such manner that the edges 26 and 28 define an equilateral triangle at the cutting face.

To secure taper in the axial plane bisecting the cutting edge 22 as well as in a plane normal thereto and parallel to the body axis, the front faces 25 are so positioned that each of the side edges 28, 28a defines, with respect to a line parallel to the body axis, an angle of 15° and the front edge 26 defines, with respect to a line parallel to the body axis, an angle of 25°. Furthermore, each face 25 defines, with respect to a plane passing through its top edge and parallel to the body axis, an angle of the order of 10°; and the faces 21 are preferably so ground as to define angles of the order of 90° with respect to the faces 25.

With the form of tool shown in Figs. 10, 11, and 12, work may be fed through a wide angular range with respect to the front of the tool while preserving the effectiveness of the pilot as a feed limiting member. With work fed in the direction of the arrow *l* in Fig. 12, the front edge 26 limits the increment of feed; if fed in the direction of the arrow *m*, the edges 26 and 28a serve together for this purpose; and, in the direction of the arrow *n*, the edges 26 and 28 are effective. Thus, it will be seen that, due to this arrangement of edges, feed may be properly limited over a wide angular range of feeding with respect to the tool. As already pointed out, the spacing of the edges at the cutting face should be equal to serve this purpose to the best advantage.

The taper given to the pilot 27 provides for the same advantages as described in connection with Figs. 1 to 9, inclusive, so far as slug spreading and slanting cuts are concerned.

Due to the taper of the pilot and to the presence of guide edges formed by sharp or angular corners it will be apparent that such corner guide edges are capable of biting or scoring into the work with the result that, on account of this action, the increment of feed is thereby increased as compared to the case where the pilot has rounded edges or has a uniform section.

From the foregoing, it will be apparent that I have provided a tool wherein the cutting face overlap is increased with respect to engaged points on the guide edges whenever the cut end tends to slant for the reason that slanting lowers such points of engagement, this being advantageous whenever slanting occurs. Accordingly, slug spreading is less of a limiting factor with the present tool and thicker and/or tougher materials may be handled. With the present type of tool, even though slanting should occur, one may work out of the slant to a straight cut. The operation will be clear from a consideration of Fig. 4 wherein the dash line represents an edge of work at the start. As there is not yet a concave slot end, the edge will engage flush against the pilot front face at the top; and, due to slug spreading, a slanted, and not a straight, cut will occur. Slanting, however, lowers the points of engagement of the slot end with the guide edges; and, as the latter converge downwardly and recede rearwardly, the cutting face overlap, with respect to the feed limiting points, will be increased so that approach to a straight cut may be quickly secured. Further, should slanting continue with cutting, it offers no objection so far as overlap is concerned, as the pilot is especially designed to accommodate slanting. The combined taper assures of sufficient overlap to maintain the bite irrespective of slanting, for, as already pointed out, the effect of slanting is to cause the work to engage the pilot at various locations depending on angle of slant. Furthermore, the rake given to the cutting face makes it possible to effect a cut even though the cutting edge should engage a slanted end, and rake tends to hold the tool in the work and makes cutting easier. By having the cutting face arranged at 90° to the pilot front face, the tool may be readily dressed or ground to provide both faces in proper relation.

While I have shown my invention in several forms, it will be obvious to those skilled in the art that it is not so limited, but is susceptible of various other changes and modifications without departing from the spirit thereof, and I desire, therefore, that only such limitations are to be placed thereupon as are imposed by the prior art or as are specifically set forth in the appended claims.

What I claim is:

1. A tool for a nibbling or cutting machine of the reciprocatory punch type comprising a cylindrical body having a cutting face and a depending pilot; said cutting face intersecting the body surface to provide an arcuate cutting edge whose ends are separated by the pilot; and said pilot being bounded by the body cylindrical surface at the back and by surfaces which converge downwardly relatively and with respect to the back surface, whereby the pilot has feed limiting and centering guide edges which converge downwardly and has its front face extending downwardly and rearwardly in the axial plane of the body bisecting the cutting edge.

2. The arrangement as claimed in claim 1 wherein the guide edges include an angle of approximately 30°.

3. A tool for a nibbling or cutting machine of the reciprocatory punch type comprising a cylindrical body having a cutting face and a depending pilot; said cutting face intersecting the body surface to provide an arcuate cutting edge whose ends are separated by the pilot; said pilot being defined by surfaces including a back surface formed by the body cylindrical surface and said surfaces converging downwardly to provide downwardly convergent lateral guide edges for limiting feed of stock and to provide for downward and rearward inclination of the pilot front face.

4. A tool for a nibbling or cutting machine of the reciprocatory punch type comprising a cylindrical body having a cutting face and a depending pilot; said cutting face intersecting the body surface to provide an arcuate cutting edge whose ends are separated by the pilot; said pilot being defined by surfaces including a back surface formed by the body cylindrical surface and a front surface arranged normally with respect to the axial plane of the body bisecting the cutting edge, said surfaces converging downwardly to provide downwardly convergent lateral edges for limiting feed of stock and to provide for downward and rearward inclination of said front surface.

5. A tool for a nibbling or cutting machine of the reciprocatory punch type comprising a cylindrical body having a cutting face and a depending pilot; said cutting face intersecting the body surface to provide an arcuate cutting edge whose ends are separated by the pilot; said pilot being defined by surfaces including a back surface formed by the body cylindrical surface and front flat surfaces; said surfaces converging downwardly to provide downwardly-convergent lateral edges for limiting feed of stock and for rearward and downward inclination of the pilot front; and said cutting face defining an angle of approximately 90° with respect to at least one of said flat surfaces to give rake or bite to the cutting edge.

6. A tool for a nibbling or cutting machine of the reciprocatory punch type comprising a cylindrical body having a cutting face and a depending pilot; said cutting face intersecting the body surface to provide an arcuate cutting edge whose ends are separated by the pilot; and said pilot being bounded by the body cylindrical surface at the back, by downwardly convergent side surfaces, by a front surface which converges downwardly with respect to the back surface and by bevel surfaces which join the front and side surfaces, whereby the pilot is tapered downwardly both in the axial plane bisecting the arcuate cutting edge and in a plane normal to the bisecting plane and parallel to the body axis and whereby the guide edges formed by the corners of the bevel and side faces converge downwardly relatively and diverge from the axial plane of the body normal to the axial plane bisecting the cutting edge.

7. The arrangement as claimed in claim 6 wherein the cutting face and the pilot front face include an angle of approximately 90° so as to provide rake or bite for the cutting edge.

8. A tool for a nibbling or cutting machine of the reciprocatory punch type comprising a cylindrical body having a cutting face and a depending pilot; said cutting face intersecting the body surface to provide an arcuate cutting edge whose ends are separated by the pilot; said pilot being bounded by the body cylindrical surface at the back, by downwardly convergent side surfaces including an angle of approximately 30°, by a front surface which, at the cutting face is approximately coincident with a body diameter normal to the diameter bisecting the cutting edge and which extends downwardly and rearwardly so as to define an angle of approximately 10° with respect to the body axis, and by bevel surfaces joining the front and side surfaces; and the corners provided by the meeting bevel and side faces providing feed-limiting and centering guide edges which converge downwardly and which extend downwardly and diverge from the axial plane of the body normal to the axial plane bisecting the cutting edge.

9. A tool for a nibbling or cutting machine of the reciprocatory punch type comprising a cylindrical body having a cutting face and a depending pilot; said cutting face intersecting the body surface to provide an arcuate cutting edge whose ends are separated by the pilot; said pilot being bounded by the body cylindrical surface and by a pair of front faces which meet to provide a front edge and which meet the back surface to provide lateral edges; said front edge serving as a feed limiting edge when the direction of feed is approximately along the line of the body diameter bisecting the cutting edge and the front edge and one or the other of the lateral edges serving as feed limiting edges when the direction of feed is at an angle to said line; and said front faces converging both toward each other and toward the back face so that the front edge is inclined downwardly and rearwardly, and converges with respect to each of the lateral edges and so that the lateral edges converge downwardly toward each other; said cutting face including portions arranged at 90° to said front faces.

10. A tool for a nibbling or cutting machine of the reciprocatory punch type comprising a cylindrical body having a cutting face and a depending pilot; said cutting face intersecting the body cylindrical surface to provide an arcuate cutting edge whose ends are separated by the pilot; and said pilot being defined by front and back surfaces, including a back surface formed by the body cylindrical surface, which converge downwardly to give a downwardly-tapered formation to the pilot and said cutting and front faces being arranged at right angles.

11. A tool for a nibbling or cutting machine of the reciprocatory punch type comprising a cylindrical body having a cutting face and a depending pilot; said cutting face intersecting the body cylindrical surface to provide an arcuate cutting edge whose ends are separated by the pilot; and said pilot being defined by surfaces including front and back surfaces which converge downwardly to give tapered formation to the pilot and the back surface being provided by the body cylindrical surface; said pilot having side edges formed by surface intersections and which converge downwardly to include an angle of the order of 30°; and said cutting and front faces being arranged at right angles and defining an angle of the order of 10° with resepct to a plane normal to the body axis and with respect to a plane parallel to the body axis.

12. A tool for a nibbling or cutting machine of the reciprocatory punch type comprising a cylindrical body having a cutting face and a depending pilot; said cutting face intersecting the body cylindrical surface to provide an arcuate cutting edge whose ends are separated by the pilot; and the pilot having downwardly-converging angular guide edges and a front face which slopes backwardly and downwardly.

CHARLES B. GRAY.